United States Patent
Pansare et al.

(10) Patent No.: US 11,349,249 B2
(45) Date of Patent: May 31, 2022

(54) CIRCULAR CONNECTOR IN INTEGRATED IN HINGE

(71) Applicant: Apple Inc., Cupertino, CA (US)

(72) Inventors: Nikhil S. Pansare, Santa Clara, CA (US); Mahmoud R. Amini, Sunnyvale, CA (US); John J. Sekerak, II, Nevada City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/585,471

(22) Filed: Sep. 27, 2019

(65) Prior Publication Data

US 2021/0098928 A1   Apr. 1, 2021

(51) Int. Cl.
| | |
|---|---|
| *H01R 13/50* | (2006.01) |
| *H01R 13/502* | (2006.01) |
| *H01R 24/60* | (2011.01) |
| *H01R 13/405* | (2006.01) |
| *H01R 13/52* | (2006.01) |
| *G06F 1/16* | (2006.01) |
| *H01R 107/00* | (2006.01) |
| *H01R 13/6581* | (2011.01) |

(52) U.S. Cl.
CPC ......... *H01R 13/502* (2013.01); *H01R 13/405* (2013.01); *H01R 13/5213* (2013.01); *H01R 24/60* (2013.01); *G06F 1/1616* (2013.01); *H01R 13/6581* (2013.01); *H01R 2107/00* (2013.01); *H01R 2201/06* (2013.01)

(58) Field of Classification Search
CPC .... H01R 13/502; H01R 24/60; H01R 13/405; H01R 13/5213; G06F 1/16
See application file for complete search history.

(56) References Cited

U.S. PATENT DOCUMENTS

| | | | | |
|---|---|---|---|---|
| 5,572,769 | A | * | 11/1996 | Spechts ................. E05C 17/045 |
| | | | | 16/337 |
| 6,088,240 | A | * | 7/2000 | Steinhoff ................ H04M 1/03 |
| | | | | 361/814 |
| 8,198,563 | B2 | | 6/2012 | Tsai |
| 9,086,841 | B1 | * | 7/2015 | Yu .......................... E05D 11/082 |
| 9,142,926 | B2 | | 9/2015 | Tsai |
| 9,882,323 | B2 | | 1/2018 | Tziviskos et al. |
| 9,991,640 | B2 | | 6/2018 | Tziviskos et al. |
| 10,096,956 | B1 | * | 10/2018 | Wu ....................... H01R 13/521 |

(Continued)

OTHER PUBLICATIONS

U.S. Appl. No. 16/139,029, Non-Final Office Action dated Apr. 21, 2020, 15 pages.

(Continued)

*Primary Examiner* — Rockshana D Chowdhury
*Assistant Examiner* — Douglas R Burtner
(74) *Attorney, Agent, or Firm* — Kilpatrick Townsend & Stockton, LLP

(57) ABSTRACT

Connector receptacles that can provide a high signal quality or signal integrity to allow high-speed data transfers, can be reliably manufactured, can be durable and have good wear performance, and can be positioned in nonstandard locations in an electronic device. One example can provide connector receptacles that can provide a high signal quality or signal integrity by utilizing a comprehensive grounding scheme. These connector receptacles can be located in a hinge of an electronic device.

19 Claims, 6 Drawing Sheets

(56) References Cited

U.S. PATENT DOCUMENTS

| | | | |
|---|---|---|---|
| 11,152,749 B2* | 10/2021 | Xu | H01R 13/521 |
| 2006/0105623 A1* | 5/2006 | Chien | G06F 1/1683 |
| | | | 439/500 |
| 2007/0176797 A1* | 8/2007 | Rhodes | G01C 21/26 |
| | | | 340/995.15 |
| 2013/0244494 A1* | 9/2013 | Tziviskos | H01R 13/405 |
| | | | 439/676 |
| 2013/0330976 A1* | 12/2013 | Simmel | H01R 13/659 |
| | | | 439/660 |
| 2014/0273590 A1* | 9/2014 | Sharma | G06F 1/1656 |
| | | | 439/350 |
| 2015/0162684 A1 | 6/2015 | Amini | |
| 2015/0200493 A1* | 7/2015 | Gao | H01R 13/6581 |
| | | | 439/607.28 |
| 2015/0200504 A1 | 7/2015 | Little | |
| 2015/0295362 A1* | 10/2015 | Tziviskos | H01R 13/6585 |
| | | | 439/607.01 |
| 2016/0056592 A1* | 2/2016 | Sharma | G06F 21/31 |
| | | | 361/679.55 |
| 2016/0106190 A1* | 4/2016 | Song | F16M 11/2021 |
| | | | 361/679.3 |
| 2016/0329667 A1 | 11/2016 | Tsai | |
| 2017/0133795 A1* | 5/2017 | Guo | H01R 13/6581 |
| 2017/0155216 A1 | 6/2017 | Yao | |
| 2017/0201048 A1 | 7/2017 | Kong | |
| 2017/0201053 A1 | 7/2017 | Guo | |
| 2017/0229823 A1* | 8/2017 | Tsai | H01R 24/60 |
| 2017/0271822 A1* | 9/2017 | Zhang | H01R 12/7082 |
| 2017/0324188 A1 | 11/2017 | Guo | |
| 2017/0338576 A1 | 11/2017 | Sato | |
| 2018/0076581 A1 | 3/2018 | Tsai | |
| 2018/0131111 A1* | 5/2018 | Tziviskos | H01R 13/6658 |
| 2018/0175568 A1* | 6/2018 | McCracken | H01R 24/64 |
| 2018/0191116 A1* | 7/2018 | Wang | H01R 13/6585 |
| 2019/0103697 A1 | 4/2019 | Amini | |
| 2021/0399500 A1* | 12/2021 | Chang | H01R 13/6593 |

OTHER PUBLICATIONS

U.S. Appl. No. 16/139,029, Notice of Allowance dated Oct. 8, 2020, 7 pages.

* cited by examiner

CIRCULAR CONNECTOR IN INTEGRATED IN HINGE

BACKGROUND

Power and data can be provided from one electronic device to another over cables that can include one or more wires, fiber optic cables, or other conductors. Connector inserts can be located at each end of these cables and can be inserted into connector receptacles in the communicating or power transferring electronic devices.

Given the large amounts of data that can be transferred among connected devices, it can be desirable that these connector receptacles be capable of supporting high data rates. That is, it can be desirable that these connector receptacles provide a high signal quality or signal integrity to allow high-speed data transfers between electronic devices.

Some of these electronic devices become tremendously popular. As a result, electronic devices having these connector receptacles can be sold in very large quantities. Therefore, it can be desirable that these connector receptacles be readily manufactured.

Users can connect and disconnect these connector inserts and connector receptacles many times during a devices' lifetime. On occasion, a wrong connector insert can be inserted a connector receptacle. That is, a connector insert of a first type of connector system can be inserted into a connector receptacle of a second type of connector system. It this connector receptacle breaks or shows signs of wear prematurely, it can reduce user satisfaction and reflect poorly on the device.

These connector receptacles can be located along a side or edge of an electronic device. But some devices can be very thin to a point where it can be difficult to find a location for a connector receptacle. Therefore, it can be desirable that these connector receptacles be able to be positioned in nonstandard locations in an electronic device.

Thus, what is needed are connector receptacles that can provide a high signal quality or signal integrity to allow high speed data transfers, can be reliably manufactured, can be durable and have good wear performance, and can be positioned in nonstandard locations in an electronic device.

SUMMARY

Accordingly, embodiments of the present invention can provide connector receptacles that can provide a high signal quality or signal integrity to allow high-speed data transfers, can be reliably manufactured, can be durable and have good wear performance, and can be positioned in nonstandard locations in an electronic device.

These and other embodiments of the present invention can provide connector receptacles that can provide a high signal quality or signal integrity by utilizing a comprehensive grounding scheme. The connector receptacle assembly can include robust ground connections. For example, a tongue of the connector receptacle can include a grounded center plate. The tongue can support ground contacts that extend from a housing towards a front edge of the tongue. The ground contacts can be folded back underneath themselves near the front edge of the tongue. The ground contacts can terminate in connecting plates. The connecting plates can be soldered, spot or laser welded, or otherwise attached to the center plate. This can provide a good ground path between the ground contacts and the center plate. The tongue of the connector receptacle can also support ground pads on its top and bottom sides. These ground pads can connect to the center plate for further improvement in grounding.

These connector receptacles can also be well-grounded to their electronic devices. For example, the connector receptacle assembly can be mated with an endcap, where the endcap provides a connector tunnel or opening for a corresponding connector insert to enter when the corresponding connector insert is mated with the connector receptacle. The ground pads can be connected to, or be formed with, a backplate behind a portion of the housing. The ground pads can also be connected to, or formed along with, side tabs on a side of the housing, or the side tabs can be extensions of the center plate. The backplate and housing can include openings for fasteners. The fasteners can be inserted through the openings in the backplate and housing and into the endcap, thereby grounding the backplate to the endcap. The side tabs can also connect to the endcap thereby providing another ground path. The endcap can be grounded to a portion of a device enclosure, such as a portion of a hinge, using a gasket formed of conductive fabric over foam or other ground connection. The endcap can be held in place using a conductive or nonconductive adhesive, such as a conductive pressure-sensitive adhesive, a conductive temperature-sensitive or heat-activated adhesive, or other adhesive layer.

These connector receptacles can also be well-grounded with corresponding connector inserts when the connector receptacles are mated with the corresponding connector inserts. For example, a shield of the connector insert can connect to the connector tunnel of the endcap. Side ground contacts in the connector insert can contact side ground contacts on sides of the connector receptacle tongue. The side ground contacts on sides of the connector receptacle tongue can be located in notches in the tongue and can be formed by edges of the center plate. Front ground contacts in the connector insert can mate with the ground pads on the tongue of the connector receptacle, and ground contacts in the connector insert can connect to ground contacts on the tongue of the connector receptacle.

These and other embodiments can provide connector receptacles that can be readily manufactured. For example, a connector receptacle consistent with an embodiment of the present invention can be manufactured using primarily stamping and injection molding steps.

These and other embodiments can provide connector receptacles that can be durable and have good wear performance. On occasion, a user can plug a connector insert for a first type of connector system into a connector receptacle of a second type of connector system. These inadvertent insertions can damage a portion of a connector receptacle. Such damage can reduce a functionality of an electronic device housing the connector receptacle. One type of damage that can occur can be the lifting of a pin from a housing or a tongue of the connector receptacle. This lifting can cause the pin to be damaged by being pushed back into the connector receptacle.

Accordingly, these and other embodiments of the present invention can provide connector receptacle tongues where leading edges of contacts on the tongue are covered with an overmold. In these and other embodiments of the present invention, the leading edges of the tongue contacts can be angled towards the tongue. Some or all of the tongue can be covered with an overmold. The overmold can be located over the leading edges of the tongue contacts. This can prevent the contacts from being separated from the tongue and damaged when a connector insert for a first type of connector system is inserted into a connector receptacle for a second type of connector system.

These and other embodiments can provide connector receptacles that can be located in nonstandard locations in an electronic device. For example, some devices, such as keyboards or portable computing devices, can be very thin and might not be able to support a connector receptacle on a side of the device. Accordingly, these and other embodiments can provide connector receptacles that can be located in a hinge of an electronic device. In this example, the endcap and the housing for the connector receptacle can have a circular profile or cross-section. The connector tunnel of the endcap can provide access to a tongue of the connector receptacle assembly at an end of a cylindrical hinge near a side of the device. The connector receptacle assembly can be attached to the endcap using fasteners and the endcap can be attached to an inside surface of the hinge using a conductive or nonconductive adhesive, such as a conductive pressure-sensitive adhesive, a conductive temperature-sensitive or heat-activated adhesive, or other adhesive layer. The hinge can connect to a top portion and a bottom portion, where the top portion can rotate about the hinge and move relative to the bottom portion. The bottom portion can be a base, a bottom support, a bottom portion of a stand, a base of a stand, lower portion, foundation, pedestal, or other portion of an electronic device. The top portion can be a lid, a top support, a top portion of a stand, an upright portion, upright portion of a stand, an upright support, an upper portion, upper piece, upper support, or other portion of an electronic device.

In these and other embodiments of the present invention, various components can be located in either of both of the bottom portion (base) and top portion (lid) of an electronic device housing a connector receptacle. For example, either or both the bottom portion and the top portion can house or support various electronic components, circuits, or electronic devices. These electronic components, circuits, or electronic devices can connect to, and can be powered by, the connector receptacle. For example, electronic components, circuits, or electronic devices can be located in either or both the bottom portion or top portion and can include a keyboard, connectors, battery, touchpad, trackpad, display, touchscreen, user input devices, user input controls, or other electronic components or combination thereof. Either or both the top portion and bottom portion can also or instead include one or more magnets, support structures, or recesses for supporting or holding one or more electronic components, circuits, or electronic devices such as cell phones, tablet computers, handheld computing devices, or other devices or combination thereof. Either or both the top portion and bottom portion can also or instead include one or more connectors in or near the one or more magnets, support structures, or recesses or elsewhere for connecting to these electronic components, circuits, or electronic devices. These one or more connectors can be connected to a connector receptacle connection. This connection can provide pathways for power and data between the connector receptacle and electronic components, circuits, or electronic devices. Where these electronic components, circuits, or electronic devices includes a battery, power can be provided from the battery to an external device via the connector receptacle. Where these electronic components, circuits, or electronic devices includes a battery, charging power can be received by the battery from an external source via the connector receptacle.

While embodiments of the present invention can be useful in Universal Serial Bus (USB) Type-C connector receptacles, these and other embodiments of the present invention can be used as connector receptacles in other types of connector systems. For example, they can be used in a charging USB-Type-C connector where some or all of the high-speed data contacts are omitted.

In these and other embodiments of the present invention, the center plate, ground pads, contacts, ground contacts, backplate, side tabs, endcap, and other conductive portions of the connector receptacle can be formed by stamping, metal-injection molding, machining, micro-machining, 3-D printing, forging, lathing, coining, deep drawing, or other manufacturing process.

In these and other embodiments of the present invention, the center plate, ground pads, contacts, ground contacts, backplate, side tabs, endcap, and other conductive portions of the connector receptacle can be formed of stainless steel, steel, copper, copper titanium, palladium nickel, phosphor bronze, or other material or combination of materials. The center plate, ground pads, contacts, ground contacts, backplate, side tabs, and endcap can be plated or coated with nickel, bright nickel, gold, or other material.

In these and other embodiments of the present invention, the housings and other nonconductive portions and other structures of the connector receptacle can be formed using injection or other molding, 3-D printing, machining, or other manufacturing process.

In these and other embodiments of the present invention, the housings and other nonconductive portions and other structures of the connector receptacle can be formed of silicon or silicone, rubber, hard rubber, plastic, nylon or other thermoplastic, polymers, such as liquid-crystal polymers (LCPs), ceramics, or other nonconductive material or combination of materials.

These and other embodiments of the present invention can provide connector receptacles that can be located in, and can connect to, various types of devices, such as portable computing devices, tablet computers, desktop computers, laptops, all-in-one computers, keyboards, wearable computing devices, cell phones, smart phones, media phones, storage devices, portable media players, navigation systems, monitors, power supplies, video delivery systems, adapters, remote control devices, chargers, and other devices. These connector receptacles can provide interconnect pathways for signals that are compliant or compatible with various standards such as one of the USB standards including USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. Other embodiments of the present invention can provide connector receptacles that can be used to provide a reduced set of functions for one or more of these standards. In various embodiments of the present invention, these interconnect paths provided by these connector receptacles can be used to convey power, ground, signals, test points, and other voltage, current, data, or other information.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
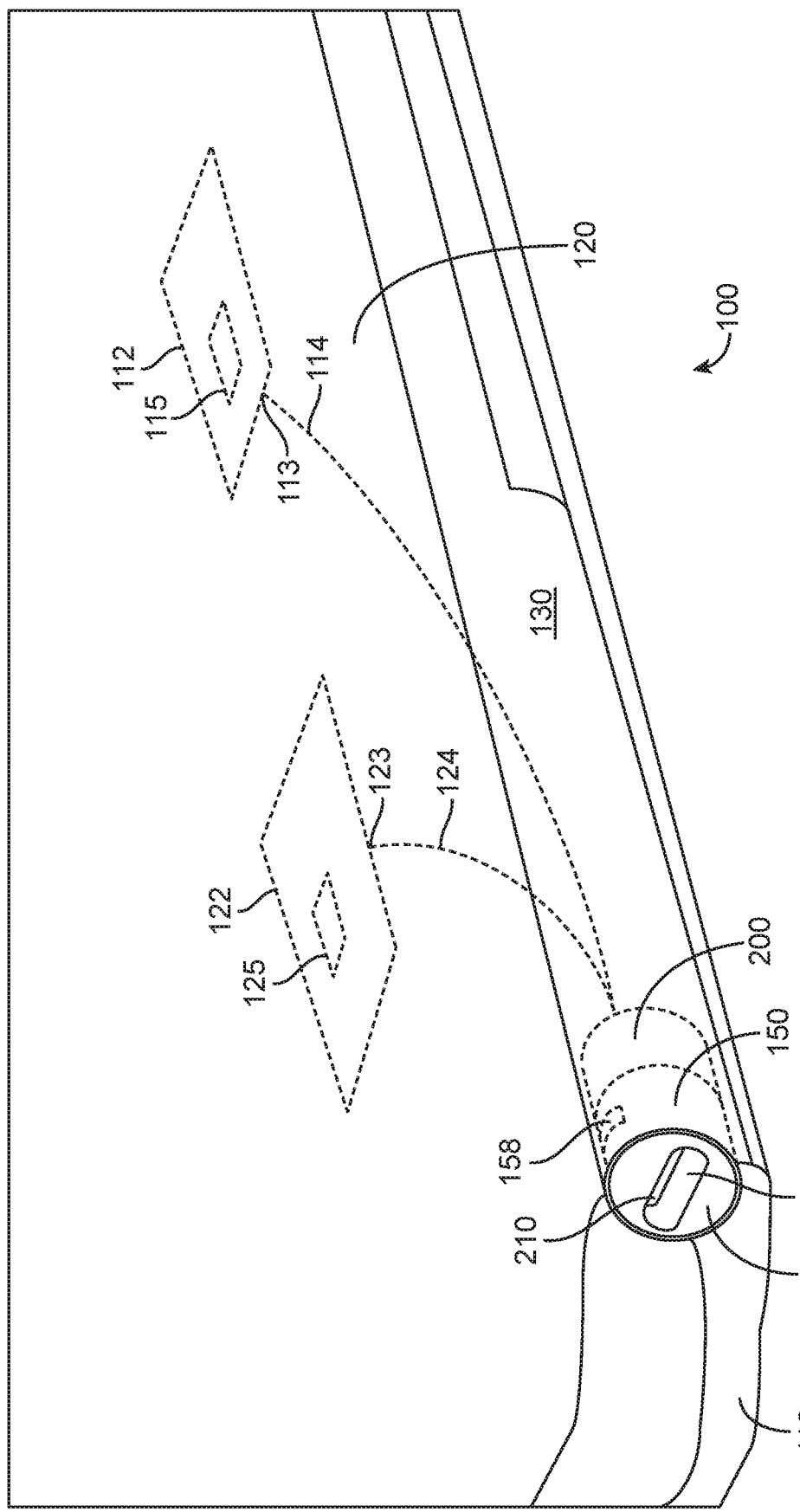
FIG. 1 illustrates an electronic device according to an embodiment of the present invention.

FIG. 1 illustrates an electronic device according to an embodiment of the present invention. This figure, as with the other included figures, is shown for illustrative purposes and does not limit either the possible embodiments of the present invention or the claims.

Electronic device 100 can include a bottom portion or base 110 and a top portion or lid 120. Base 110 and lid 120 can be joined by hinge 130. Lid 120 can rotate about hinge 130, thereby moving relative to base 110. Both lid 120 and base 110 can be narrow or thin and it can be difficult to position a connector receptacle along their sides. Accordingly, embodiments of the present invention can provide a connector receptacle 140 that can be positioned in hinge 130. This connector receptacle 140 can have a circular (as shown) profile or cross-section, or it can have other shapes.

Connector receptacle 140 can include an endcap 150 that can be located at an end of hinge 130. Endcap 150 can be fixed to an inside surface of hinge 130 using a conductive or nonconductive adhesive, such as a conductive pressure-sensitive adhesive, a conductive temperature-sensitive or heat-activated adhesive, or other adhesive layer (not shown.) Endcap 150 can be grounded to hinge 130 through electromagnetic interference (EMI) gasket 158. Endcap 150 can include a connector tunnel 152 that provides access to tongue 210 of a connector receptacle assembly 200 (shown further in FIG. 2.) Connector tunnel 152 can allow access to tongue 210 by a corresponding connector insert (not shown) when in the connector insert is mated with connector receptacle 140. Endcap 150 can be attached to connector receptacle assembly 200 using fasteners 620 (shown in FIG. 6.) Endcap 150 can help to provide protection for connector receptacle assembly 200 when electronic device 100 is dropped, when a cable having a connector insert inserted in connector receptacle 140 is pulled on, and at other times.

Base 110 of electronic device 100 can house or support various electronic components, circuits, or electronic devices 112. These electronic components, circuits, or electronic devices 112 can connect to, and can be powered by, connector receptacle 140. For example, electronic components, circuits, or electronic devices 112 in base 110 can include a keyboard, connectors, battery, touchpad, trackpad, display, touchscreen, user input devices, user input controls, or other electronic components or combination thereof. Base 110 can also or instead include one or more magnets, support structures, or recesses 115 for supporting or holding one or more electronic components, circuits, or electronic devices 112 such as cell phones, tablet computers, handheld computing devices, or other devices or combination thereof. Base 110 can also include one or more connectors 113 in or near the one or more magnets, support structures, or recesses 115 or elsewhere for connecting to these electronic components, circuits, or electronic devices 112. These one or more connectors 113 can be connected to connector receptacle 140 via connection 114. Connection 114 can provide pathways for power and data between connector receptacle 140 and electronic components, circuits, or electronic devices 112 either directly or via connector 113. Where electronic components, circuits, or electronic devices 112 includes a battery, power can be provided from the battery to an external device via connector receptacle 140. Where electronic components, circuits, or electronic devices 112 includes a battery, charging power can be received by the battery from an external source via connector receptacle 140.

Lid 120 of electronic device 100 can house or support various electronic components, circuits, or electronic devices 122. These electronic components, circuits, or electronic devices 122 can connect to, and can be powered by, connector receptacle 140. For example, electronic components, circuits, or electronic devices 122 in lid 120 can include a keyboard, connectors, battery, touchpad, trackpad, display, touchscreen, user input devices, user input controls, or other electronic components or combination thereof. Lid 120 can also or instead include one or more magnets, support structures, or recesses 125 for supporting or holding one or more electronic components, circuits, or electronic devices 122 such as cell phones, tablet computers, handheld computing devices, or other devices or combination thereof. Lid 120 can also include one or more connectors 123 in or near the one or more magnets, support structures, or recesses 125 or elsewhere for connecting to these electronic components, circuits, or electronic devices 122. These one or more connectors 123 can be connected to connector receptacle 140 via connection 124. Connection 124 can provide pathways for power and data between connector receptacle 140 and electronic components, circuits, or electronic devices 122, either directly or via connectors 123. Where electronic components, circuits, or electronic devices 122 includes a battery, power can be provided from the battery to an external device via connector receptacle 140. Where electronic components, circuits, or electronic devices 122 includes a battery, charging power can be received by the battery from an external source via connector receptacle 140.

As one example, connector receptacle assembly 200 can be connected to connector 123 in lid 120 via connection 124. Connection 124 can include a number of conductors (not shown) that are connected between contacts 222 and ground contacts 224 in connector receptacle assembly 200 (shown in FIG. 2) and contacts (not shown) in connector 123. Connector 123 can be connected to electronic components, circuits, or electronic devices 122, such as a tablet computer, attached to lid 120 (for example by magnets.) In this way, power and data received at connector receptacle 140 can be provided to the tablet computer.

As another example, connector receptacle assembly 200 can be connected to electronic components, circuits, or electronic devices 122 in base 110 via connection 114. Connection 114 can include a number of conductors (not shown) that are connected between contacts 222 and ground contacts 224 in connector receptacle assembly 200 (shown in FIG. 2) and electronic components, circuits, or electronic devices 122. Connection 114 can be connected to electronic components, circuits, or electronic devices 112, such as a keyboard, in or attached to base 110. In this way, power and data (such as firmware updates) received at connector receptacle 140 can be provided to the keyboard.

In these and other embodiments of the present invention, base 110 can be a bottom portion, a bottom support, a bottom portion of a stand, a base of a stand, lower portion, foundation, pedestal, or other portion of an electronic device. In these and other embodiments of the present invention, lid 120 can be a top portion, a top support, a top portion of a stand, an upright portion, upright portion of a stand, an upright support, an upper portion, upper piece, upper support, or other portion of an electronic device.

Figure 2:
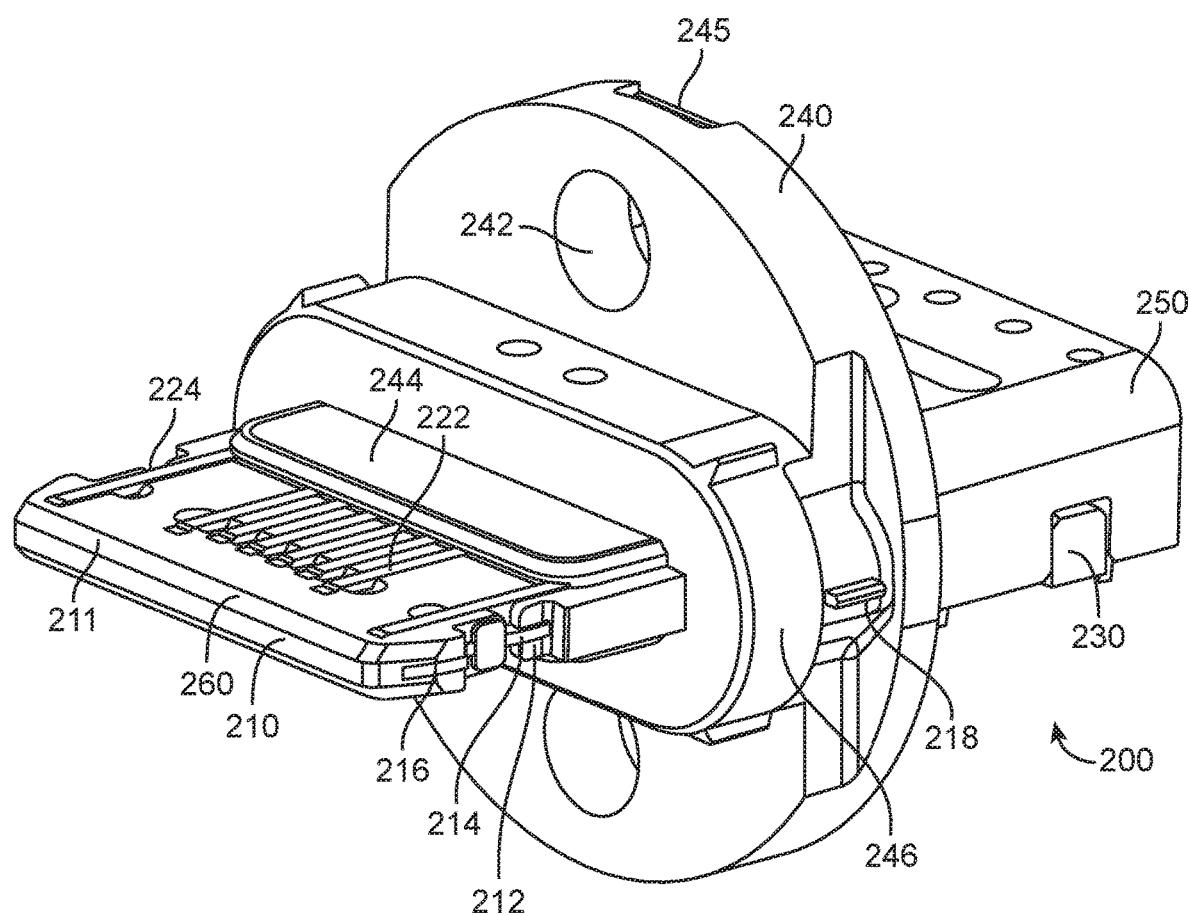
FIG. 2 illustrates a connector receptacle assembly according to an embodiment of the present invention.

FIG. 2 illustrates a connector receptacle assembly according to an embodiment of the present invention. Connector receptacle assembly 200 can include housing 240 supporting tongue 210. Tongue 210 can include front edge 211. Tongue 210 can support a number of contacts 222 on its top and bottom sides. Contacts 222 can extend from housing 240 towards front edge 211 of tongue 210. Tongue 210 can also support ground contacts 224 on its top and bottom sides. Ground contacts 224 can extend from housing 240 towards front edge 211 of tongue 210. Side ground contacts 214 can be located in notches 212 on sides of tongue 210. Side ground contacts 214 can be formed by edges of center plate 216, which can be located in a center of tongue 210. Overmold 260 can cover leading edges of contacts 222 and ground contacts 224, as well as a front edge 211 of tongue 210. Overmold 260 can be formed as a double-shot molding over a portion of tongue 210.

Figure 3:
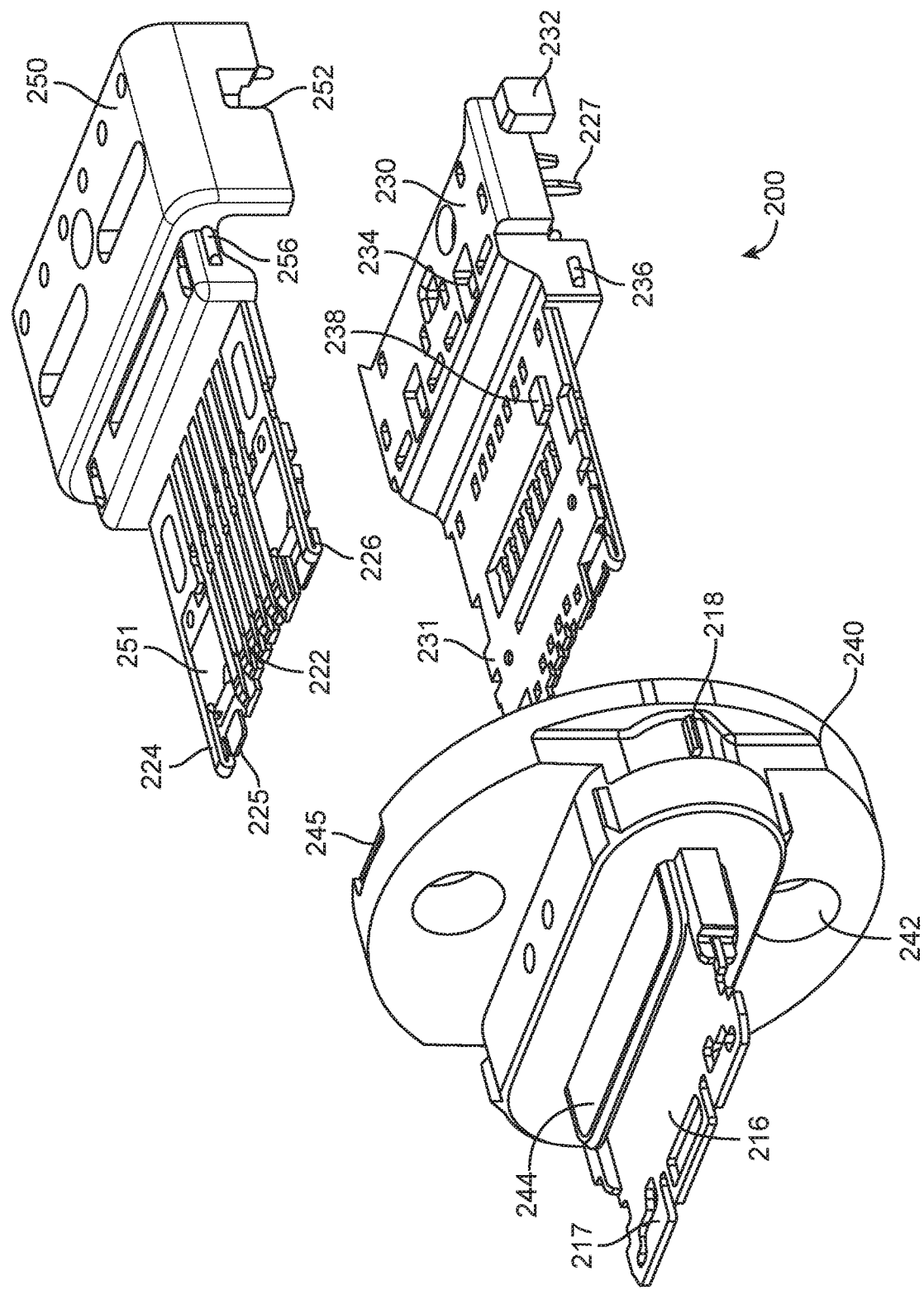
FIG. 3 illustrates a partially exploded view of a connector receptacle assembly according to an embodiment of the present invention.

Ground pads 244 can be located top and bottom sides of tongue 210. Ground pads 244 can connect to, or be formed with, side tabs 218 on sides of housing 240, or side tabs 218 can be formed as extensions of center plate 216. Backplate 245 can be attached to ground pads 244, ground contacts 224, center plate 216, and side tabs 218. Backplate 245 and housing 240 can include openings 242. Housing 240 can also support alignment feature 246. Contacts 222 and ground contacts 224 on a top of tongue 210 can be supported by housing 250. Contacts 222 and ground contacts 224 (not shown) on a bottom of tongue 210 can be supported by housing 230. Housing 240 and housing 230 can fit together as shown in FIG. 3.

Connector receptacle 140 can be well-grounded to its electronic device. For example, fasteners 620 (shown in FIG. 6), such as screws, bolts, or other fasteners, can be inserted through openings 242 into a backside of endcap 150 (shown in FIG. 6.) This can allow fasteners 620 to connect endcap 150 to backplate 245. Alignment feature 246 can fit in a recess in the backside of endcap 150, thereby aligning connector receptacle assembly 200 to endcap 150. An inside surface of endcap 150 can engage side tabs 218, thereby providing an additional ground path. Endcap 150 can be electrically connected to hinge 130 (shown in FIG. 1) by one or more sections of conductive fabric covered foam, shown in FIG. 1 as EMI gasket 158, or other grounding structure.

EMI gasket 158 can be formed of a compliant material that is at least partially covered by a conductive layer. The compliant material can be foam or foam rubber, such as silicon rubber open cell foam, silicon rubber, polyurethane foam, or other compressible material. The conductive layer can be a conductive film, such as tin-plated polyimide film, a conductive fabric, or other conductive layer. In these and other embodiments of the present invention, EMI gasket 158 can be formed of conductive foam. EMI gasket 158 can be attached to endcap 150 or other connector receptacle portions using a conductive adhesive, such as a conductive pressure-sensitive adhesive, a conductive temperature-sensitive or heat-activated adhesive, or other adhesive layer.

Connector receptacle 140 can also be well-grounded to a corresponding connector insert when the corresponding connector insert is mated with connector receptacle 140. For example, a shield of the corresponding connector insert (not shown) can physically and electrically connect to connector tunnel 152 in endcap 150. Side ground contacts in the connector insert can physically and electrically connect to side ground contacts 214 on tongue 210. Front ground contacts in the connector insert can physically and electrically connect to ground pads 244 on top and bottom sides of tongue 210. Ground contacts in the connector insert can physically and electrically connect to ground contacts 224 on top and bottom sides of tongue 210.

Connector receptacle assembly 200 can also be internally well-grounded. This is shown further in the following figures.

FIG. 3 illustrates a partially exploded view of a connector receptacle assembly according to an embodiment of the present invention. Connector receptacle assembly 200 can include housing 240. Housing 240 can support a center plate 216. Center plate 216 can include contacting areas 217. Housing 240 can also support ground pads 244. Ground pads 244 can also be connected to, or formed as a piece, with side tabs 218, or side tabs 218 can be formed as extensions of center plate 216. Center plate 216 and ground pads 244 can connect to, or be formed with, backplate 245. Openings 242 can provide a passage for fasteners 620 (shown in FIG. 6) through housing 240 and backplate 245. These fasteners 620 can then connect backplate 245 to endcap 150.

Contacts 222 and ground contacts 224 on a top side of tongue 210 (shown in FIG. 2) can be supported by front portion 251 of housing 250. Housing 250 can be insert molded around contacts 222 and 224. Ground contacts 224 can extend from housings 240 and 250 and can be folded back on itself as folded portion 226. Connecting plate 225 can extend from folded portion 226. During assembly, connecting plate 225 can be soldered, spot or laser welded, or otherwise fixed to contacting areas 217 of center plate 216.

Notch 252 of housing 250 can accept tab 232 on housing 230. Notches 234 on housing 230 can accept tabs (not shown) on an underside of housing 250. Tab 236 on housing 230 can fit in notch 256 on housing 250. Tab 238 on housing 230 can fit in a notch (not shown) on the underside of housing 250. Contacts 222 and ground contacts 224 (not shown) on a bottom side of tongue 210 can be supported by front portion 231 of housing 230. Contacts 222 and ground contacts 224 can terminate in through-hole contact portions 227.

Figure 4:
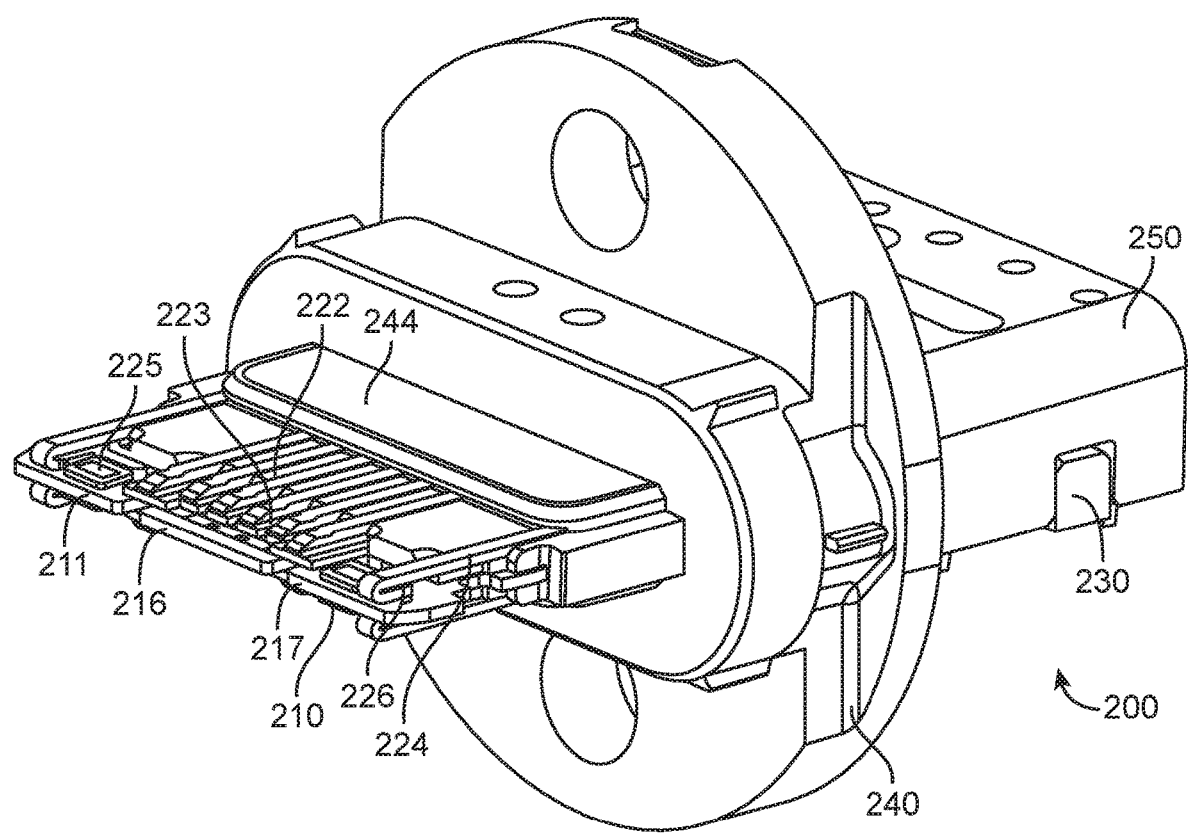
FIG. 4 illustrates a partial view of a connector receptacle assembly according to an embodiment of the present invention.

FIG. 4 illustrates a partial view of a connector receptacle assembly according to an embodiment of the present invention. As shown, housing 250 can be attached to housing 230 and front portions 251 and 231 (shown in FIG. 3) of housing 250 and housing 230 have been fit through openings in housing 240 between center plate 216 and ground pads 244, thereby substantially forming connector receptacle assembly 200. Connecting plates 225 have been fixed to contacting areas 217 of center plate 216. Contacts 222 can include a front-tapered portion 223 near a front edge 211 of tongue 210.

On occasion, a user can insert an incompatible connector insert into connector receptacle 140 (shown in FIG. 1.) This incompatible connector insert can encounter and provide force against tongue 210. Without more, some of the contacts 222 and ground contacts 224 can be pushed back and away from tongue 210, thereby damaging connector receptacle assembly 200. Accordingly, embodiments of the present invention can provide overmold 260 (shown in FIG. 2.) This overmold 260 can protect front edges of ground contacts 224 such as folded portion 226 and connecting plates 225. Overmold 260 can also protect front-tapered portion 223 of contacts 222. This can help to prevent contacts 222 and ground contacts 224 from being separated from tongue 210 during an inadvertent insertion of an incompatible connector insert into connector receptacle 140.

Figure 5:
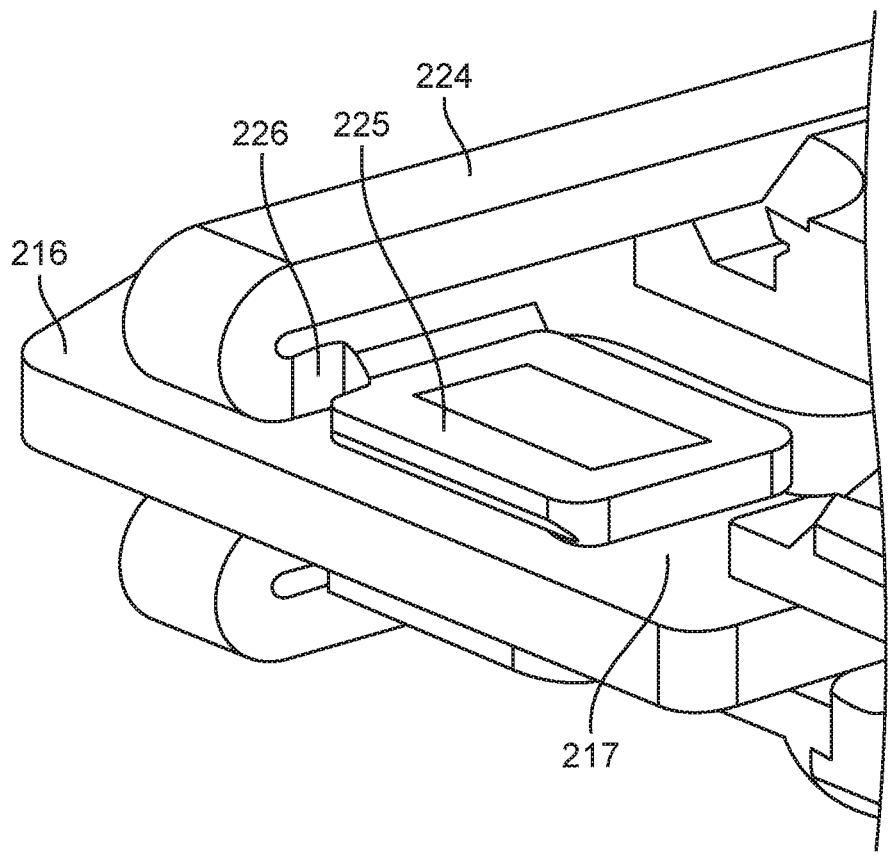
FIG. 5 illustrates a close-up view of a portion of a connector receptacle assembly according to an embodiment of the present invention.

FIG. 5 illustrates a close-up view of a portion of a connector receptacle assembly according to an embodiment of the present invention. In this example, ground contact 224 can terminate in folded portion 226. Connecting plate 225 can extend at a right angle from folded portion 226. Connecting plate 225 can be soldered, spot, or laser welded to contacting area 217 of center plate 216.

These and other embodiments of the present invention can provide connector receptacles that can provide a high signal quality or signal integrity by utilizing a comprehensive grounding scheme. This is shown further in the following figure.

Figure 6:
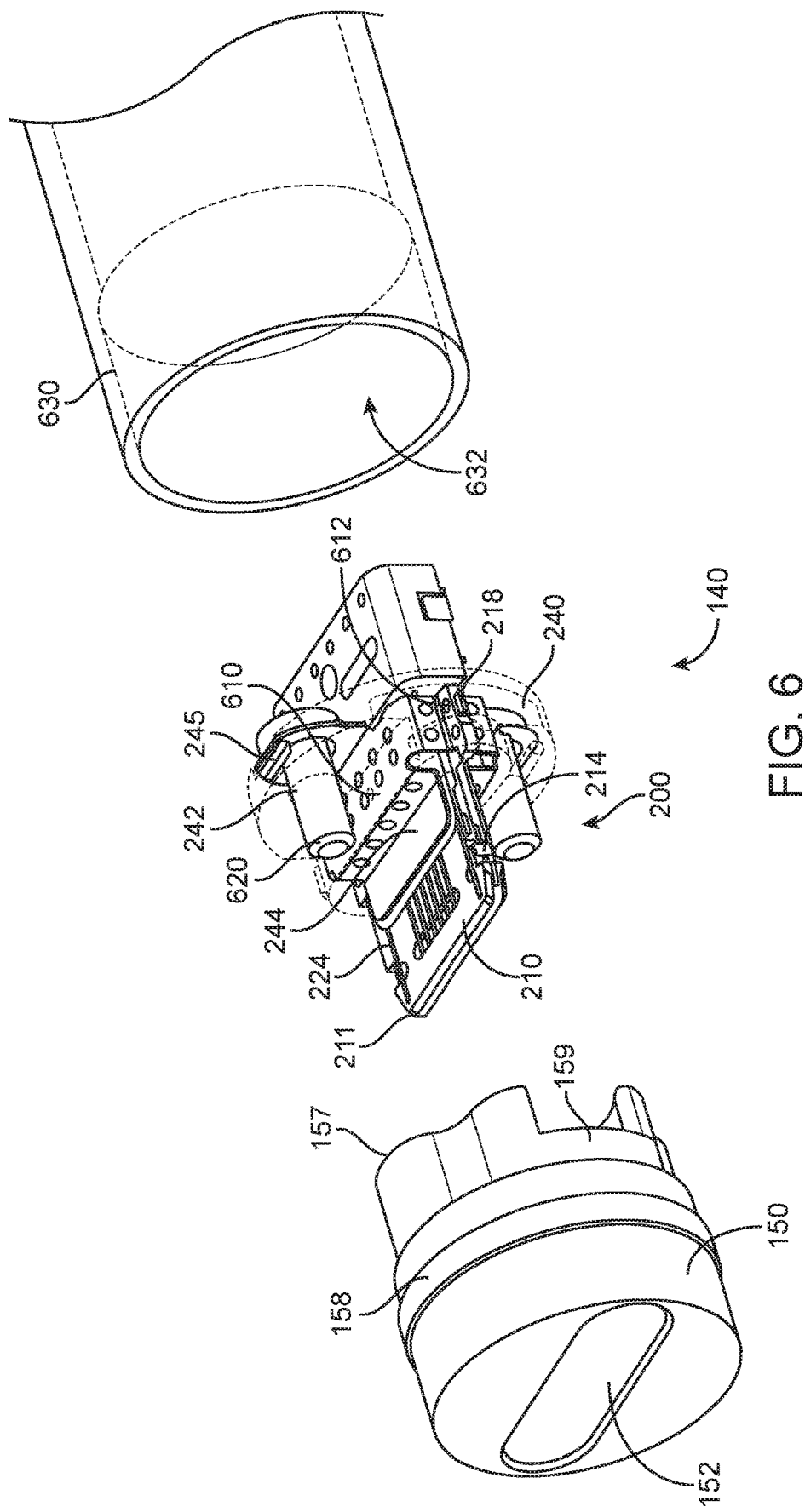
FIG. 6 illustrates a partially exploded view of a connector receptacle according to an embodiment of the present invention.

FIG. 6 illustrates a partially exploded view of a connector receptacle according to an embodiment of the present invention. Connector receptacle assembly 200 can include robust ground connections. For example, tongue 210 of connector receptacle 140 can include a grounded center plate 216 (shown in FIG. 3.) Tongue 210 can support ground contacts 224 that extend from housing 240 towards a front edge 211 of tongue 210. Ground contacts 224 can be folded back underneath themselves to form folded portions 226 (shown in FIG. 5) near front edge 211 of tongue 210. Ground contacts 224 can terminate in connecting plates 225 (shown in FIG. 5.) Connecting plates 225 can be soldered, spot or laser welded, or otherwise attached to center plate 216. This can provide a good ground path between ground contacts 224 and center plate 216. Tongue 210 of connector receptacle 140 can also support ground pads 244 on its top and bottom sides. These ground pads 244 can be attached to, or formed with, shielding 610. Shielding 610 can be spot or laser welded to center plate 216 at points 612 for further improvement in grounding. Ground pads 244 can be formed with, or attached to, shielding 610 and backplate 245. Shielding 610 can also be formed with, or attached to, side tabs 218, or side tabs 218 can be extensions of center plate 216. More specifically, there can be a ground pad 244 attached to, or formed along with, shielding 610 and backplate 245 on a top and bottom side of tongue 210. Shielding 610 on the top and bottom of tongue 210 can be spot or laser welded to center plate 216 at points 612. Side tabs 218 can be extensions of center plate 216 or they can be formed from shielding 610.

These connector receptacles 140 can also be well-grounded to their electronic devices, such as electronic device 100 (shown in FIG. 1.) For example, connector receptacle assembly 200 can be mated with endcap 150, where endcap 150 provides an opening or connector tunnel 152 for a corresponding connector insert (not shown) to enter when the corresponding connector insert is mated with connector receptacle 140. Ground pads 244 can be connected to, or be formed with, backplate 245 behind a portion of housing 240. Ground pads 244 can also be connected to, or formed along with, side tabs 218 on a side of housing 240. Backplate 245 and housing 240 can include openings 242 for fasteners 620. Fasteners 620 can be inserted through openings 242 in backplate 245 and housing 240 and into endcap 150 (in holes near location 157), thereby grounding endcap 150 to backplate 245. Side tabs 218 can also connect to endcap 150 (near points 159) thereby providing another ground path. Endcap 150 can be grounded to a portion of a device enclosure, such as an inside surface 632 of hinge tube 630, using EMI gasket 158. EMI gasket 158 can be formed of conductive fabric over foam or other ground connection. Endcap 150 can be held in place in hinge tube 630 (which can be a portion of hinge 130 shown in FIG. 1) using a conductive or nonconductive adhesive, such as a conductive pressure-sensitive adhesive, a conductive temperature-sensitive or heat-activated adhesive, or other adhesive layer (not shown.)

These connector receptacles 140 can also be well-grounded with corresponding connector inserts (not shown) when the connector receptacles 140 are mated with the corresponding connector inserts. For example, a shield (not shown) of the connector insert can connect to connector tunnel 152 of endcap 150. Side ground contacts in the connector insert can contact side ground contacts 214 on sides of connector receptacle tongue 210. The side ground contacts 214 on sides of the connector receptacle tongue can be formed by edges of center plate 216. Front ground contacts (not shown) in the connector insert can mate with ground pads 244 on tongue 210 of connector receptacle 140, and ground contacts (not shown) in the connector insert can connect to ground contacts 224 on tongue 210 of connector receptacle 140.

While embodiments of the present invention can be useful as USB Type-C connector receptacles, these and other embodiments of the present invention can be used as connector receptacles in other types of connector systems. For example, they can be used in a charging USB-Type-C connector where some or all of the high-speed data contacts are omitted. The examples here illustrate a USB Type-C connector receptacle where contacts for high-speed differential signals have been omitted. In these and other embodiments of the present invention, the contacts for the high-speed differential signals can be included. In these and other embodiments of the present invention, other contacts can be included or omitted.

In these and other embodiments of the present invention, center plate 216, ground pads 244, contacts 222, ground contacts 224, backplate 245, side tabs 218, endcap 150, and other conductive portions of connector receptacle 140 can be formed by stamping, metal-injection molding, machining, micro-machining, 3-D printing, forging, lathing, coining, deep drawing, or other manufacturing process.

In these and other embodiments of the present invention, center plate 216, ground pads 244, contacts 222, ground contacts 224, backplate 245, side tabs 218, endcap 150, and other conductive portions of connector receptacle 140 can be formed of stainless steel, steel, copper, copper titanium, palladium nickel, phosphor bronze, or other material or combination of materials. Center plate 216, ground pads 244, contacts 222, ground contacts 224, backplate 245, side tabs 218, endcap 150, and other conductive portions of connector receptacle 140 can be plated or coated with nickel, bright nickel, gold, or other material.

In these and other embodiments of the present invention, housing 230, housing 240, housing 250, and other nonconductive portions and other structures of connector receptacle 140 can be formed using injection or other molding, 3-D printing, machining, or other manufacturing process.

In these and other embodiments of the present invention, housing 230, housing 240, housing 250, and other nonconductive portions and other structures of connector receptacle 140, can be formed of silicon or silicone, rubber, hard rubber, plastic, nylon or other thermoplastic, polymers, such as liquid-crystal polymers (LCPs), ceramics, or other non-conductive material or combination of materials.

Embodiments of the present invention can provide connector receptacles that can be located in, and can connect to, various types of devices, such as portable computing devices, tablet computers, desktop computers, laptops, all-in-one computers, wearable computing devices, cell phones, smart phones, media phones, storage devices, portable media players, navigation systems, monitors, power supplies, video delivery systems, adapters, remote control devices, chargers, and other devices. These connector receptacles can provide interconnect pathways for signals that are compliant or compatible with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning™ Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. Other embodiments of the present invention can provide connector receptacles that can be used to provide a reduced set of functions for one or more of these standards. In various embodiments of the present invention, these interconnect paths provided by these connector receptacles can be used to convey power, ground, signals, test points, and other voltage, current, data, or other information.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector receptacle comprising:
   a tongue comprising a center plate;
   a first plurality of signal contacts on a top side of the tongue;
   a first plurality of ground contacts on the top side of the tongue, wherein each ground contact includes a first portion extending from a housing to a first end near a front edge of the tongue, each ground contact folded along a line parallel to the front edge of the tongue such that a second portion of the ground contact extends towards the housing under the first portion of the ground contact, the ground contact further comprising a connecting plate attached to the second portion of the ground contact and extending from the second portion of the ground contact in a direction parallel to the front edge of the tongue; and
   a ground pad including side tabs and a back plate, the back plate having an opening for a fastener to electrically connect the back plate to an end cap, wherein the side tabs are positioned to physically and electrically contact the end cap,
   wherein each connecting plate in the first plurality of ground contacts is attached to the center plate.

2. The connector receptacle of claim 1 wherein the connector receptacle is a universal serial bus type-C connector receptacle.

3. The connector receptacle of claim 2 wherein each connecting plate of the first plurality of ground contacts is attached to a top surface of the center plate.

4. The connector receptacle of claim 3 wherein the connecting plate for each ground contact is laser welded to the center plate.

5. The connector receptacle of claim 4 further comprising:
   a second plurality of signal contacts on a bottom side of the tongue; and
   a second plurality of ground contacts on the bottom side of the tongue, wherein each ground contact includes a first portion extending from the housing to a first end near a front edge of the tongue, each ground contact folded such that a second portion of the ground contact extends towards the housing over the first portion of the ground contact, the ground contact further comprising a connecting plate attached to the second portion of the ground contact and extending from the second portion of the ground contact in a direction parallel to the front edge of the tongue,
   wherein each connecting plate in the second plurality of ground contacts is attached to the center plate.

6. The connector receptacle of claim 5 further comprising an overmold formed over the front edge of each of the first plurality of ground contacts, the front edge of each of the second plurality of ground contacts, the connecting plate of each of the first plurality of ground contacts, the connecting plate of each of the second plurality of ground contacts, and the center plate.

7. The connector receptacle of claim 6 wherein each of the first plurality of signal contacts comprises a leading edge near a front edge of the tongue, and wherein the overmold is further formed over the leading edges of the first plurality of signal contacts and the second plurality of signal contacts.

8. The connector receptacle of claim 7 wherein the housing has a circular profile to fit in a circular opening in a hinge of an electronic device.

9. An electronic device comprising:
   a base;
   a lid;
   a cylindrical hinge attached to the base and the lid such that the lid can rotate about the cylindrical hinge and move relative to the base;
   an end cap located in a circular opening in an end of the cylindrical hinge, the end cap electrically connected to the cylindrical hinge; and
   a connector receptacle located in the circular opening in the end of the cylindrical hinge, wherein the connector receptacle comprises:
   a tongue comprising a center plate;
   a first plurality of signal contacts on a top side of the tongue; and
   a ground pad on the top side of the tongue, the ground pad terminating in a side tab on a side of the connector receptacle, the side tab physically and electrically contacting the end cap, wherein the ground pad is electrically connected to the cylindrical hinge through the side tab and the end cap.

10. The electronic device of claim 9 further comprising a first plurality of ground contacts, wherein each of the first plurality of ground contacts includes a first portion extending from a housing towards a front edge of the tongue and is folded such that a second portion of the ground contact extends towards the housing under the first portion of the ground contact, the ground contact further comprising a connecting plate attached to the second portion of the ground contact and extending from the second portion of the ground contact in a direction parallel to the front edge of the tongue.

11. The electronic device of claim 10 further comprising an overmold portion formed over the second portion of each of the first plurality of ground contacts, the connecting plate of each of the first plurality of ground contacts, and the center plate.

12. The electronic device of claim 9 wherein the end cap is electrically connected to the cylindrical hinge through a conductive gasket.

13. The electronic device of claim 12 wherein the ground pad comprises a back plate adjacent to a housing, wherein the housing is attached to the end cap by a fastener, and wherein the ground pad is further electrically connected to the cylindrical hinge through the back plate, the fastener, the end cap, and the conductive gasket.

14. The electronic device of claim 13 wherein the end cap comprises a connector tunnel to provide access to the tongue of the connector receptacle.

15. An electronic device comprising:
a bottom support;
an upright support;
a hinge attached to the bottom support and the upright support such that the upright support can rotate about the hinge and move relative to the bottom support;
a connector receptacle located in an opening in an end of the hinge;
an end cap located in the opening the end of the hinge and attached to the connector receptacle by a plurality of fasteners; and
a ground pad, the ground pad including side tabs and a back plate, the back plate having an opening for a fastener in the plurality of fasteners, wherein the ground pad is electrically connected to the end cap through the side tabs, and the ground pad is further electrically connected to the end cap through the fastener and back plate.

16. The electronic device of claim 15 wherein the connector receptacle is a universal serial bus type-C connector receptacle.

17. The electronic device of claim 15 wherein the hinge is cylindrical.

18. The electronic device of claim 15 wherein the opening in the end of the hinge is circular.

19. The electronic device of claim 15 wherein the end cap is electrically connected to the hinge through a conductive gasket.

* * * * *